United States Patent Office 3,052,729
Patented Sept. 4, 1962

3,052,729
HYDROGENATION OF CIS-3,4-EPOXY-p-MENTHANE
Habib Emile Eschinazi, Montclair, N.J., now by change of name Emile Haviv Eschinasi, assignor to The Givaudan Corporation, New York, N.Y., a corporation of New Jersey
No Drawing. Filed Apr. 2, 1958, Ser. No. 725,794
1 Claim. (Cl. 260—631)

This invention relates to a process for hydrogenating cis-epoxy cyclohexanes having at least two substituents, one of which substituents is on a carbon atom of the oxirane ring.

It will be appreciated that the indicated epoxy compounds are rather complex organic compounds, capable of existing in various isomeric forms and giving rise to conversion products which may also exist in different isomeric forms. Since it often happens that certain isomeric forms of organic compounds are considered more desirable on practical considerations, than other isomeric forms, and since this is true of the conversion products of epoxy cyclohexanes, it is an object of this invention to provide a process for converting the aforesaid epoxy compounds into derivatives which are more esteemed than their isomers. It is another object of this invention to provide a process for converting the aforesaid epoxy compounds into substantially pure derivatives, i.e., derivatives which comprise only 1 isomeric form and not mixtures of 2 or more isomeric forms.

In accordance with this invention, the epoxy compounds employed are cis-epoxy cyclohexanes having at least 2 substituents, one of which is on a carbon atom of the oxirane ring. Examples of such compounds include cis-3,4-epoxy-p-menthane, cis-1,2-epoxy-p-menthane, cis-1,2-epoxy 8-(9) p-menthene and cis-1,2 epoxy pinane.

I have found that when the afore-indicated cis-epoxy cyclohexanes are subjected to hydrogenation with hydrogen in the presence of Raney nickel under suitable reaction condition, there results substantially complete conversion of the epoxy starting materials into the corresponding hydroxy compounds, the unsaturated side chain, where present in the starting material, also being saturated. The following represents the reaction schemes involved:

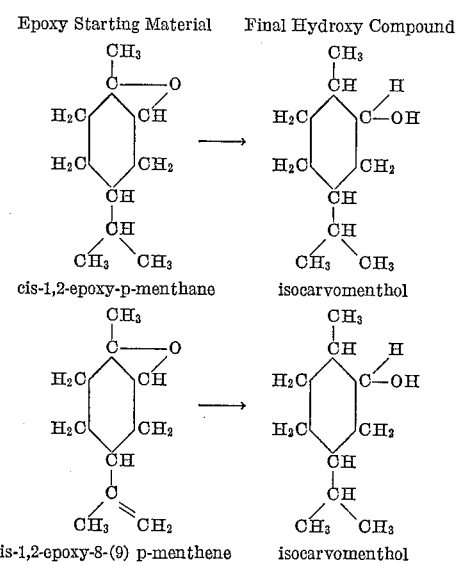

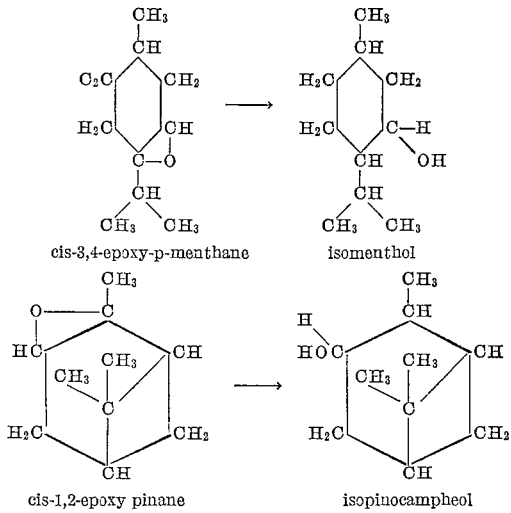

That the cis-epoxy cyclohexanes noted above would form the corresponding hydroxy compounds in excellent yields in accordance with this invention was quite unexpected. For one thing, they (i.e., the cis-epoxy cyclohexanes) form mixtures of isomeric hydroxy compounds when subjected to more drastic hydrogenating conditions, e.g., in the presence of copper chromite hydrogenating catalyst. Also, the corresponding trans-epoxy cyclohexanes when treated under the same conditions as the cis-compounds, in accordance with this invention do not undergo any rupture of the oxirane ring

and are recovered unchanged, except in the case of trans-1,2-epoxy-8-(9) p-menthene, which is hydrogenated to trans-1,2-epoxy-p-menthane. Furthermore, the corresponding trans-epoxy cyclohexanes, when treated with hydrogen in the presence of a copper chromite hydrogenating catalyst do not form hydroxy compounds but dissociate into unsaturated hydrocarbons and oxygen. In brief, it is only the combination of the cis-epoxy cyclohexanes and the Raney nickel hydrogenating catalyst in the presence of hydrogen which will permit the desired conversion into the corresponding hydroxy compounds.

The unexpected selectivity of the cis-epoxy cyclohexanes has a practical application on the commercial preparation of menthol from 3-p-menthene. When this latter material is treated with peracids in known manner, a mixture consisting of about 60% of the cis and about 40% of the trans isomer of 3,4-epoxy p-menthane forms, as indicated by the specific absorption peaks in the infrared spectrum of the reaction mixture (cis: 10.3; 13 micron bands) (trans: 10.2; 13.2 micron bands). When the resulting mixture is hydrogenated in accordance with the conditions of this invention the cis-epoxy isomer is converted into isomenthol, the trans-isomer remaining unreacted. The isomenthol is then isomerized in known manner to menthol. The unreacted trans 3,4-epoxy p-menthane is subsequently acid-rearranged into menthone and the latter may be hydrogenated to menthols by means of known hydrogenating catalysts, such as copper chromite.

As already indicated, the starting materials employed in accordance with the present invention are cis-epoxy cyclohexanes having at least two substituents, one of which is on a carbon atom of the oxirane ring. It will be understood that the cyclohexanes may contain a fused ring which itself has substituents, as in the case of cis-1,2-epoxy pinane. Other examples of suitable cis-epoxy cyclohexanes which may be employed include:

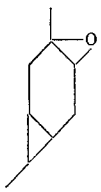
3,4 epoxy carane

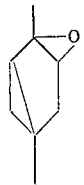
α-Thujene oxide

If desired, the cis-epoxy compounds may be used per se, or in admixture with each other, or with corresponding trans-epoxy cyclohexanes, or with other substances.

The reaction conditions employed in the hydrogenation of the cis-epoxy cyclohexanes in accordance with this invention may vary widely. Thus, while it is preferred to operate within a temperature range of within about 60° C. to about 90° C., temperatures from about 50° C. to about 150° C. may be used, if desired, or temperatures even, somewhat outside this latter range. Further, the hydrogenation reaction is conducted under superatmospheric pressure. Pressures within the range of about 15 and about 600 pounds per square inch (p.s.i.) can be employed, but advantageous results are obtained when pressures within the range of about 200 and about 300 p.s.i. are used.

With respect to the time of the reaction, this will vary, depending mainly on the temperature and pressure employed. For instance, with a mixture of 250 g. of cis and trans -3,4-epoxy-p-menthanes at 80° C. and 250 p.s.i. hydrogen pressure the hydrogenation of the cis-3,4-epoxy p-menthane in the presence of Raney nickel catalyst was complete in 7–8 hours; and no significant absorption of hydrogen was observed when carrying the reaction for an additional 4 hours.

In conducting the process of this invention, the starting material, i.e., the cis-epoxy cyclohexane, with or without a solvent, and Raney nickel, are placed in an autoclave, for example, a rocking autoclave. The air is removed from the autoclave under a high vacuum and hydrogen gas is introduced until the desired pressure is attained. The autoclave is agitated and electrical heating is begun. The temperature is maintained as desired and hydrogen gas is occasionally introduced in order to maintain the pressure in the desired range.

The completion of reaction is indicated by the absence of any drop in pressure. The contents of the autoclave are cooled when there is no further absorption of hydrogen gas and the pressure is released. The reaction product is then removed from the autoclave, filtered to remove the Raney nickel and then distilled.

In order further to illustrate this invention, but without limiting it, the following examples are given. Unless otherwise stated, all temperatures are in degrees centigrade.

*Example I*

The following materials were charged into a stainless steel insert adapted for use in a standard rocking type autoclave of 1½ liter capacity:

155 g. of 3,4-epoxy-p-menthanes mixture
10 g. of Raney nickel catalyst.

The aforesaid mixture of epoxy menthanes consisted of 60% of the cis and 40% of the trans isomers, as determined according to infrared spectroscopic data. The mixture of epoxy menthanes had been prepared according to known procedures from 3-p-menthene and peracetic acid, and titrated 10.8% oxirane oxygen.

The air was removed from the autoclave under high vacuum and hydrogen gas was introduced until a pressure of 250 p.s.i. was attained. The unit was then heated and agitation was begun. The temperature was brought to 75°–78°, the pressure meanwhile having risen to 300 p.s.i. Absorption of hydrogen gas became apparent at the stated temperature range, as indicated by a noticeable drop in pressure. The autoclave contents were maintained at this temperature range, i.e., 75°–78°, for 7–9 hours, during which time additional hydrogen gas was introduced occasionally in order to maintain the pressure between 250 and 300 p.s.i. Absorption of hydrogen ceased when a total of 1.14 grams of this gas had been absorbed.

After cooling, the contents of the autoclave and releasing the excess hydrogen gas, the reaction product was removed from the insert, filtered from the still active catalyst, and then distilled. There was obtained 54–57 grams of trans-3-p-menthene oxide, boiling at 33°–35° under 1.2 mm. Hg pressure, having an index of refraction, $n_D^{20}=1.4441$, and showing an increasing band at 13.2 micron in the infrared spectrum, and titrating 11% oxirane oxygen. A second cut of 93–97.5 grams, boiling at about 64°–65° under 1.2 mm. Hg pressure, consisted of pure isomenthol melting at about 42.5°. It showed an infrared spectrum identical with that of an authentic sample of isomenthol.

*Example II*

A mixture of 3,4-epoxy-p-menthanes, as used in Example I, was hydrogenated, following the procedure given in the preceding example. The amount of the mixture used here was 250 g. and the amount of Raney nickel used here was 15 g. It was found that 1.83 grams of hydrogen gas was absorbed.

After filtration of the hydrogenated product from the still active catalyst as was done in Example I, 1000 ml. of aqueous sulfuric acid of 5% concentration was added to the hydrogenated product, which was heated to reflux for 2 hours under atmospheric pressure, followed by distillation with steam.

The steam distillate, circa 230 g., containing 138 grams of isomenthol and 57.5 grams of menthone, was placed in the autoclave described in Example I, along with 20 g. of a copper chromite catalyst. The air was evacuated and hydrogen gas was introduced until a pressure of 500 p.s.i. was reached. Agitation and heating of the autoclave were begun. When the temperature reached 200° absorption of hydrogen gas became noticeable. This temperature was maintained for 12 hours and the pressure was maintained during this time between about 450–500 p.s.i. The autoclave was cooled to room temperature and the excess hydrogen gas was released.

Following filtration from the catalyst, a mixture of menthols, weighing 200–212 g., was recovered by distillation. This mixture was shown by infrared analysis to contain 55–60% menthols, 25–30% neomenthols and 10% of iso and neoisomenthols.

*Example III*

A mixture of 250 g. of dipentene oxides, consisting of 84–88% dipentene monoxide (4–8% external), 5–6% dipentene hydroxyacetate and 7–8% of dipentene as marketed, e.g., by Becco Chemical Division, Food Machinery and Chemical Corporation, Buffalo, N.Y., under the designation, dipentene monoxide, and 15 g. of Raney nickel were introduced in the autoclave described in Example I. The procedure of Example I was followed, using a reaction temperature of 65°, pressure range of 150–200 p.s.i., and a hydrogenation reaction period of 12 hours. It was found that 1.9 g. of hydrogen gas had been absorbed.

After cooling the contents of the autoclave and releasing the excess hydrogen gas, and removing the reacting product from the insert and filtering it from the still active catalyst, it was distilled. About 137.5 g., distilled at 65° under 15 mm. Hg pressure. This cut had an average index of refraction, $n_D^{20}=1.4520$ and consisted mainly of the saturated 1,2-epoxy-p-menthane, trans isomer. A second cut, 62.5–70 g. which distilled around 80° under 2 mm. Hg pressure, had a refractive index, $n_D^{20}=1.4565$, and was substantially pure isocarvomenthol.

*Example IV*

The hydrogenation treatment set forth in Example III was repeated, using 250 g. of α-pinene oxide, as marketed by the aforesaid Becco Chemical Division and consisting of 90% α-pinene oxide. It was found that 1.8 g. of hydrogen gas was absorbed.

The reaction product was treated as in the previous examples up to and including the step of filtering it from the catalyst. The reaction product was then distilled. A low boiling cut, about 75 g., distilled at 70°–75° under 25 mm. Hg pressure. A larger cut, 150 g., boiling at 80°–86° under 2 mm. Hg pressure, having an alcohol content of 90% as isocampheol, was obtained. This latter cut was identified by its infrared spectrum as pure isopinocampheol, M.P. 55°–56°.

*Example V*

A mixture of 35 g. of cis and trans-3,4-epoxy-p-menthane, as described in Example I, in 150 ml. of ethanol, was introduced into the autoclave described in Example I. After adding 5 g. of Raney nickel, the air was evacuated. Hydrogen gas, under atmospheric pressure, was introduced. Agitation at room temperature was begun.

No absorption of hydrogen gas was noted, even after 27 hours. The agitation was then stopped and the hydrogen gas was evacuated.

After filtration from the catalyst and evaporation of the ethanol, the residue was analyzed in the infrared spectroscope. There was no evidence of the formation of any menthol, the final material consisting of the starting material, i.e., the aforesaid mixture of cis- and trans-3,4-epoxy-p-menthane.

The foregoing illustrates the practice of my invention which, however, is not to be limited thereby, but is to be construed as broadly as permissible in view of the prior art and limited solely by the appended claim.

I claim:

The process, which comprises subjecting a mixture of cis- and trans-3,4-epoxy p-menthanes to the action of hydrogen in the presence of Raney nickel under a temperature within the range from about 50° C. to about 150° C. and a pressure within the range from about 15 to about 600 p.s.i., to convert the cis-3,4-epoxy p-menthane to isomenthol, converting unreacted trans-3,4-epoxy p-menthane to menthone by rearrangement under acid conditions, and, hydrogenating the menthone to menthols.

References Cited in the file of this patent

UNITED STATES PATENTS 2,561,984     Hillyer et al.     July 24, 1951

OTHER REFERENCES

Schollkopf et al.: 1,776,087, Sept. 16, 1930, 260–63IH.

Bergman; J. Applied Chem. (London), vol. 1, pp. 380–2 (1951).

Pigulevskii et al.: Chem. Abstracts, vol. 51, pp. 16357–9 (1957).